UNITED STATES PATENT OFFICE.

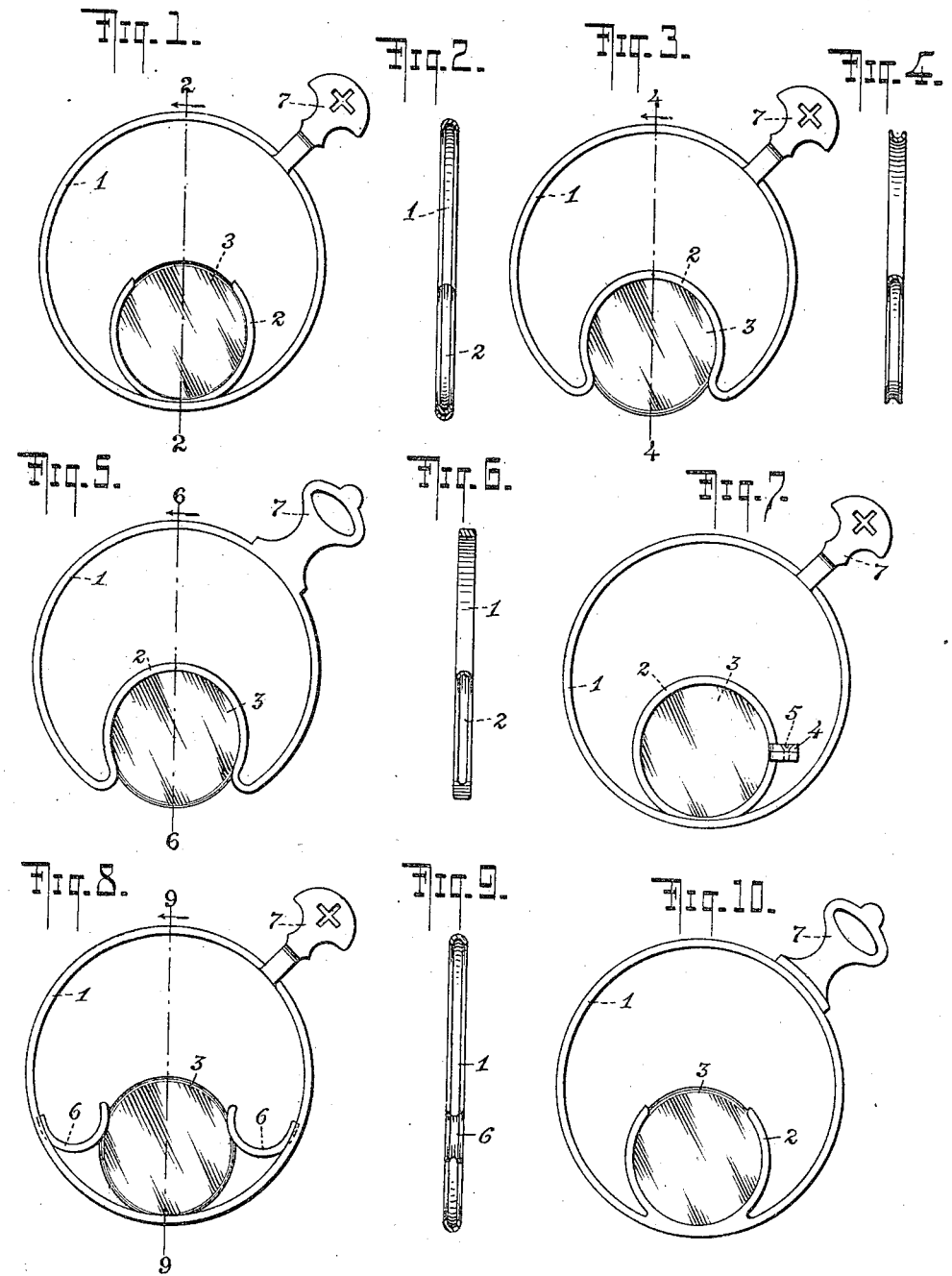

FREDERICK GOODELL BLANCHARD, OF SOUTHBRIDGE, MASSACHUSETTS, ASSIGNOR TO AMERICAN OPTICAL COMPANY, OF SOUTHBRIDGE, MASSACHUSETTS, A CORPORATION OF MASSACHUSETTS.

TRIAL-FRAME FOR BIFOCAL GLASSES.

949,109. Specification of Letters Patent. Patented Feb. 15, 1910.

Application filed October 18, 1909. Serial No. 523,308.

*To all whom it may concern:*

Be it known that I, FREDERICK GOODELL BLANCHARD, a citizen of the United States, and resident of Southbridge, Worcester county, State of Massachusetts, have invented a new and useful Improvement in Trial-Frames for Bifocal Glasses, of which the following is a specification.

My invention relates to rings (or lens holders) for trial frames, or test frames as they are sometimes called, as used by oculists and opticians in determining visual errors and ascertaining the characteristics of lenses best adapted in eye glasses or spectacles to the needs of individuals.

My invention relates particularly to devices of the class described when required for use in connection with the fitting of what are known as bifocal lenses, that is lenses comprising an upper portion adapted for one focus, as for example distance vision, and lower portion for another focus, as for example for reading.

The object of my invention is to enable lenses having different foci and different characteristics to be quickly and conveniently placed before the eyes in positions corresponding to those which will be had by the lower portions of the completed lens.

A further object of my invention is to enable such lenses to be quickly exchanged one for another.

A still further object of my invention is to enable such placing and exchange of lenses to be accomplished without risk of breakage and without handling and thereby soiling the lens proper.

Still another and most important object of my invention is to enable the preceding ends to be accomplished by the use of trial frames such as have been heretofore used and large numbers of which are already in the possession of practicing oculists and opticians.

The accompanying drawings show a number of modifications of trial rings embodying my invention.

Referring to the drawings, Figure 1 represents in elevation a preferred form of my invention as adapted to hold circular lenses; Fig. 2 is a cross section along line 2—2 of Fig. 1; Fig. 3 is a view similar to Fig. 1 showing a modification in which the lens is inserted from below; and Fig. 4 is a cross section along line 4—4 of Fig. 3; Fig. 5 is similar to Fig. 3, but represents a ring pressed by dies from sheet metal instead of formed from wire as in Fig. 3; Fig. 6 is a cross section along line 6—6 of Fig. 5; Figs. 7 and 8 are elevations showing other ways of forming the trial ring and Fig. 9 is a cross section of Fig. 8 along line 9—9 thereof; Fig. 10 represents an elevation of still another form of my invention.

The trial ring comprises essentially an outer annulus or ring 1 which may or may not include a full circle. Thus in Figs. 1, 7, 8 and 10 the annulus is complete, but in Figs. 3 and 5 a segment of about 75° is missing. It is necessary that the annulus should comprehend more than 180° in order that it may be adapted to fit into the socket or carrying portion of the trial frame with which it must be used.

Attached to annulus 1, either integrally or otherwise, is clamping means 2 adapted to hold the small lens 3 which, in the trial frames, occupies the lower position (with reference to the axis of the eye) required to be filled by the lower portion of the final bifocal lens. This clamping means 2 is preferably, as shown in Fig. 1, an incomplete annulus, the opening of which is at the top, and the bottom point of which is permanently joined to the inner periphery of annulus 1, both 2 and 1 lying in the same plane. As seen in Fig. 2, annulus 2 is grooved interiorly to fit lens 3, the limbs of said annulus having an initial spring tendency inwardly, which adapts them to firmly hold the lens when it has been pressed into place. In the form of my device shown in Figs. 1, 3 and 8 both the inner and outer annulus are formed from grooved wire such as is customarily used in the well known one lens trial rings.

In the forms shown in Figs. 3 and 5 the annulus 2 instead of being distinct from annulus 1 as in Fig. 1, is merely a reëntrant portion of the larger annulus and the lens 3 must be pressed in from without instead of from within as in the former case. The frame of Fig. 3 is formed from grooved wire as in Fig. 1, but that of Fig. 5 is pressed out by suitable dies from sheet metal and the smaller annulus 2 afterward independently grooved.

Fig. 7 shows a form of my invention which may be formed either from grooved wire or pressed from sheet metal. Its distinguishing feature is the use of a complete inner annulus formed with lugs 4 adapted to be drawn together by a set screw 5 so as to definitely clamp the trial lens 3.

Figs. 8 and 9 show an arrangement in which clamping means 2 does not appear as an annulus but is equivalented by centrally grooved segments 6 which lie in the plane of annulus 1 and are symmetrically fixed thereto on each side of a diameter. As shown, the entire frame is made of grooved wire, but it might be pressed out from sheet metal like the forms of Figs. 5 and 7, in which case annulus 1 and limbs 6 where they contact with lens 3, should be grooved so as to hold the lens. It will be noticed that the distance between the contacting portions of limbs 6 is less than the diameter of lens 3, so that the limbs not only hold the lens by lateral pressure, but also hold it down in the groove of annulus 1.

Fig. 10 differs from Fig. 1 only in that it is pressed up from sheet metal, the inner annulus 2 being afterward grooved to receive the lens.

In all of the various forms I have shown a handle 7, which may be separately attached by solder or other means, or, may be integrally formed particularly in the case of those forms which are stamped from sheet metal.

Many variations of detail may be made without departing from the spirit of my invention. Thus instead of arranging the smaller annulus of the trial ring for circular lenses as shown by the drawings, I might so form the annulus as to adapt it to hold bi-circular, oval and bi-oval, or almost any other desired form. Also instead of rounding the edge of lens 3 and grooving the smaller annulus I might groove the edge of the lens and form the annulus from wire adapted to lie in such groove.

Wherever the word annulus is used in this specification I refer to that part of a circle or equivalent form including anything greater than 180° of arc to 360°.

As above described it will be seen that by the use of my invention the smaller lens of a bifocal combination can be as quickly determined for a given individual as can the usual single lens and the risk of breakage, soiling and confusion in handling the lenses is exactly the same, neither greater nor less than for said larger lens.

Having now described my invention I claim:

1. In a lens fitting device of the character described provided with an outer ring, means fixed to said ring adapted to hold a lens eccentrically thereto, as and for the purpose described.

2. In a lens fitting device of the character described provided with an outer ring, means fixed to said ring adapted to hold a lens eccentrically thereto but in the plane of said ring, as and for the purpose described.

3. In a lens fitting device of the character described provided with an outer ring, means fixed to said ring adapted to hold a lens within but eccentrically to said ring, as and for the purpose described.

4. In a lens fitting device of the character described provided with an outer ring, holding means within and fixed to said ring, said holding means being adapted to hold a lens eccentrically as to said ring, as and for the purpose described.

5. In a lens fitting device of the character described provided with an outer ring, holding means within and fixed to said ring, said holding means being adapted to removably hold a lens eccentrically as to said ring, as and for the purpose described.

6. A lens fitting device comprising an outer ring adapted to fit a trial frame and an inner smaller ring fixed thereto, said smaller ring being adapted to hold a lens, as and for the purpose described.

7. A lens fitting device comprising an outer incomplete ring adapted to fit a trial frame and an inner incomplete ring adapted to hold a lens, said rings being adjacent at their incomplete portions and having their corresponding ends united, as and for the purpose described.

8. A lens fitting device comprising an outer ring adapted to fit a trial frame, a portion of said ring being extended inwardly and circularly so as to constitute a lens holding ring, as and for the purpose described.

9. A lens fitting device comprising an outer ring adapted to fit a trial frame and means within and fixed to said ring adapted to hold a lens inwardly tangent thereto, as and for the purpose described.

In testimony whereof I have hereunto set my hand in the presence of two subscribing witnesses.

FREDERICK GOODELL BLANCHARD

Witnesses:
H. W. WISE,
WM. H. SEARLES.